United States Patent
Fabijancic et al.

(10) Patent No.: US 9,569,441 B2
(45) Date of Patent: Feb. 14, 2017

(54) ARCHIVAL OF OBJECTS AND DYNAMIC SEARCH

(71) Applicants: Toni Fabijancic, Eppelheim (DE); Axel Herbst, Eppingen-Rohrbach (DE); Jan Nolte-Boemelburg, Bad Schoenborn (DE); Mathias Roeher, Walldorf (DE)

(72) Inventors: Toni Fabijancic, Eppelheim (DE); Axel Herbst, Eppingen-Rohrbach (DE); Jan Nolte-Boemelburg, Bad Schoenborn (DE); Mathias Roeher, Walldorf (DE)

(73) Assignee: SAP SE, Walldorf (DE)

( * ) Notice: Subject to any disclaimer, the term of this patent is extended or adjusted under 35 U.S.C. 154(b) by 369 days.

(21) Appl. No.: 14/049,857

(22) Filed: Oct. 9, 2013

(65) Prior Publication Data
US 2015/0100553 A1   Apr. 9, 2015

(51) Int. Cl.
G06F 17/00 (2006.01)
G06F 7/00 (2006.01)
G06F 17/30 (2006.01)

(52) U.S. Cl.
CPC ... G06F 17/30073 (2013.01); G06F 17/30569 (2013.01); *Y02B 60/188* (2013.01)

(58) Field of Classification Search
CPC ............ G06F 17/30073; G06F 17/30569
USPC .......................................... 707/673
See application file for complete search history.

(56) References Cited

U.S. PATENT DOCUMENTS

| | | | |
|---|---|---|---|
| 6,014,670 A * | 1/2000 | Zamanian | G06F 17/30563 707/999.1 |
| 7,243,110 B2 * | 7/2007 | Grondin et al. | 707/693 |
| 7,536,423 B2 | 5/2009 | Brinkmoeller et al. | |
| 7,653,666 B2 | 1/2010 | Brinkmoeller et al. | |
| 7,996,373 B1 * | 8/2011 | Zoppas | G06F 17/3051 707/694 |
| 8,024,382 B2 | 9/2011 | Evans et al. | |
| 8,051,045 B2 | 11/2011 | Vogler | |
| 8,326,805 B1 * | 12/2012 | Arous | G06F 17/30073 707/661 |
| 8,463,724 B2 | 6/2013 | Theobald | |
| 2002/0010867 A1 * | 1/2002 | Schaefer | G06F 21/6236 726/29 |
| 2003/0074188 A1 * | 4/2003 | Murata | G06F 17/271 704/9 |
| 2004/0103392 A1 | 5/2004 | Zhang | |
| 2004/0260534 A1 * | 12/2004 | Pak | G06F 17/30864 704/7 |
| 2005/0060286 A1 | 3/2005 | Hansen et al. | |
| 2005/0149584 A1 | 7/2005 | Bourbonnais et al. | |
| 2005/0187962 A1 * | 8/2005 | Grondin et al. | 707/102 |
| 2006/0123035 A1 | 6/2006 | Ivie | |

(Continued)

*Primary Examiner* — Pavan Mamillapalli
(74) *Attorney, Agent, or Firm* — Fountainhead Law Group P.C.

(57) ABSTRACT

In one embodiment, a method determines data stored in a plurality of tables in a first database for archiving. The data is combined from the plurality of tables into a set of objects in a readable format where an object in the set of objects includes terms from the plurality of tables associated with the object. The method then stores the set of objects in the text format in a second database where a search query processor is able to search terms in the set of objects in the readable format. Then, the data stored in the plurality of tables in the first database is deleted in response to the archiving.

20 Claims, 8 Drawing Sheets

(56) References Cited

U.S. PATENT DOCUMENTS

| | | |
|---|---|---|
| 2006/0149796 A1 | 7/2006 | Aalmink |
| 2008/0082502 A1* | 4/2008 | Gupta ............... G06F 17/30389 |
| | | 707/999.003 |
| 2008/0243957 A1* | 10/2008 | Prahlad et al. ............... 707/204 |
| 2008/0263007 A1 | 10/2008 | Schmidt |
| 2009/0199172 A1 | 8/2009 | Zhong et al. |
| 2010/0088284 A1 | 4/2010 | Cina |
| 2010/0274786 A1* | 10/2010 | Harris ............... H04L 29/12594 |
| | | 707/737 |
| 2011/0289046 A1 | 11/2011 | Leach et al. |
| 2015/0347443 A1* | 12/2015 | Reid ................ G06F 17/30946 |
| | | 707/693 |

* cited by examiner 350-1 — Archived String:
350-2

| Business Object No. | "Archived String" |
|---|---|
| 1 | (1000,Edison,Thomas,West Pike 45<sup>th</sup>)(001,Cat Food,10$;002,Dog Food,5$;003,Dog Food,5$)(20$,28.01.2013) |
| 2 | (2000,Thomas,Katharina,Narnia Av. 561)(001,Music CD,15$)(15$,29.01.2013) |
| 3 | (3000,White,Thomas,New York Street 104)(001,iPod,100$;002,iPhone,500$)(600$,02.02.2013) |
| 4 | (4000,Black,Bronco,Thomas Street 2000)(001,PC,1000$;002,Mouse,10$;003,LCD,200$;004,Headset,20$)(1230$,04.02.2013) |

Search for Thomas could return all 4 Business Objects

| Business Object No. | "Archived String" |
|---|---|
| 1 | (1000,Edison,Thomas,West Pike 45th)(001,Cat Food,10$;002,Dog Food,5$;003,Dog Food,5$)(20$,28.01.2013) |
| 2 | (2000,Thomas,Katharina,Narnia Av. 561)(001,Music CD,15$)(15$,29.01.2013) |
| 3 | (3000,White,Thomas,New York Street 104)(001,iPod,100$;002,iPhone,500$)(600$,02.02.2013) |
| 4 | (4000,Black,Bronco,Thomas Street 2000)(001,PC,1000$;002,Mouse,10$;003,LCD,200$;004,Headset,20$)(1230$,04.02.2013) |

FIG. 5A

Search for 2000 could return 2 Business Objects

| Business Object No. | "Archived String" |
|---|---|
| 1 | (1000,Edison,Thomas,West Pike 45th)(001,Cat Food,10$;002,Dog Food,5$;003,Dog Food,5$)(20$,28.01.2013) |
| 2 | (2000,Thomas,Katharina,Narnia Av. 561)(001,Music CD,15$)(15$,29.01.2013) |
| 3 | (3000,White,Thomas,New York Street 104)(001,iPod,100$;002,iPhone,500$)(600$,02.02.2013) |
| 4 | (4000,Black,Bronco,Thomas Street 2000)(001,PC,1000$;002,Mouse,10$;003,LCD,200$;004,Headset,20$)(1230$,04.02.2013) |

FIG. 5B

ARCHIVAL OF OBJECTS AND DYNAMIC SEARCH

BACKGROUND

Unless otherwise indicated herein, the approaches described in this section are not prior art to the claims in this application and are not admitted to be prior art by inclusion in this section.

A company typically queries data in the relational database to generate reports with the data. Thus, the relational database is designed to allow efficient retrieval of data. However, with the amount of data being stored in databases, a company may want to archive some of the data to create more space in the relational database. For example, the company archives the data stored in the relational database into an archive database. The archived data is typically stored in a compressed file in a proprietary format, and then the compressed file is stored in the archive database. This compressed file is unsearchable. Therefore, the archive database does not allow fast access and search capabilities with the archived data.

One solution to enable searching of the archived data requires that the company create an index for the archived data. To create the index, the company needs to determine which columns it wants to be able to do a look-up for before doing the indexing. For example, a company may want to index for the invoice number. In this case, the archived data may be indexed via the invoice number and a user can search for data via the invoice number. However, the searching is limited to the columns that were determined beforehand. A user cannot search for a term in a column that has not been indexed. A company may add more columns to improve the search through the archived data, but this also leads to additional database space consumption and complexity.

SUMMARY

In one embodiment, a method determines data stored in a plurality of tables in a first database for archiving. The data is combined from the plurality of tables into a set of objects in a readable format where an object in the set of objects includes terms from the plurality of tables associated with the object. The method then stores the set of objects in the text format in a second database where a search query processor is able to search terms in the set of objects in the readable format. Then, the data stored in the plurality of tables in the first database is deleted in response to the archiving.

In one embodiment, a non-transitory computer-readable storage medium contains instructions, that when executed, control a computer system to be configured for: determining data stored in a plurality of tables in a first database for archiving; combining data from the plurality of tables into a set of objects in a readable format, wherein an object in the set of objects includes terms from the plurality of tables associated with the object; storing the set of objects in the text format in a second database, wherein a search query processor is able to search terms in the set of objects in the readable format; and deleting the data stored in the plurality of tables in the first database for archiving.

In one embodiment, an apparatus includes: one or more computer processors; and a non-transitory computer-readable storage medium comprising instructions, that when executed, control the one or more computer processors to be configured for: determining, by a computer system, data stored in a plurality of tables in a first database for archiving, wherein the data stored in the plurality of tables is in a relational data model format; combining, by the computer system, data from the plurality of tables into a set of objects in a readable format, wherein an object in the set of objects includes terms from the plurality of tables associated with the object; storing, by the computer system, the set of objects in the text format in a second database in the readable format, wherein a search query processor is able to search terms in the set of objects in the readable format, wherein the data stored in the second database is compressed in the second database; and deleting, by the computer system, the data stored in the plurality of tables in the first database for archiving.

The following detailed description and accompanying drawings provide a better understanding of the nature and advantages of particular embodiments.

BRIEF DESCRIPTION OF THE DRAWINGS

FIG. 3B shows an example of archived objects in a LOB table according to one embodiment.

FIG. 5A shows a first example of a search result according to one embodiment.

FIG. 5B shows a second example of a search result according to one embodiment.

DETAILED DESCRIPTION

Described herein are techniques for an archival system. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Figure 1:
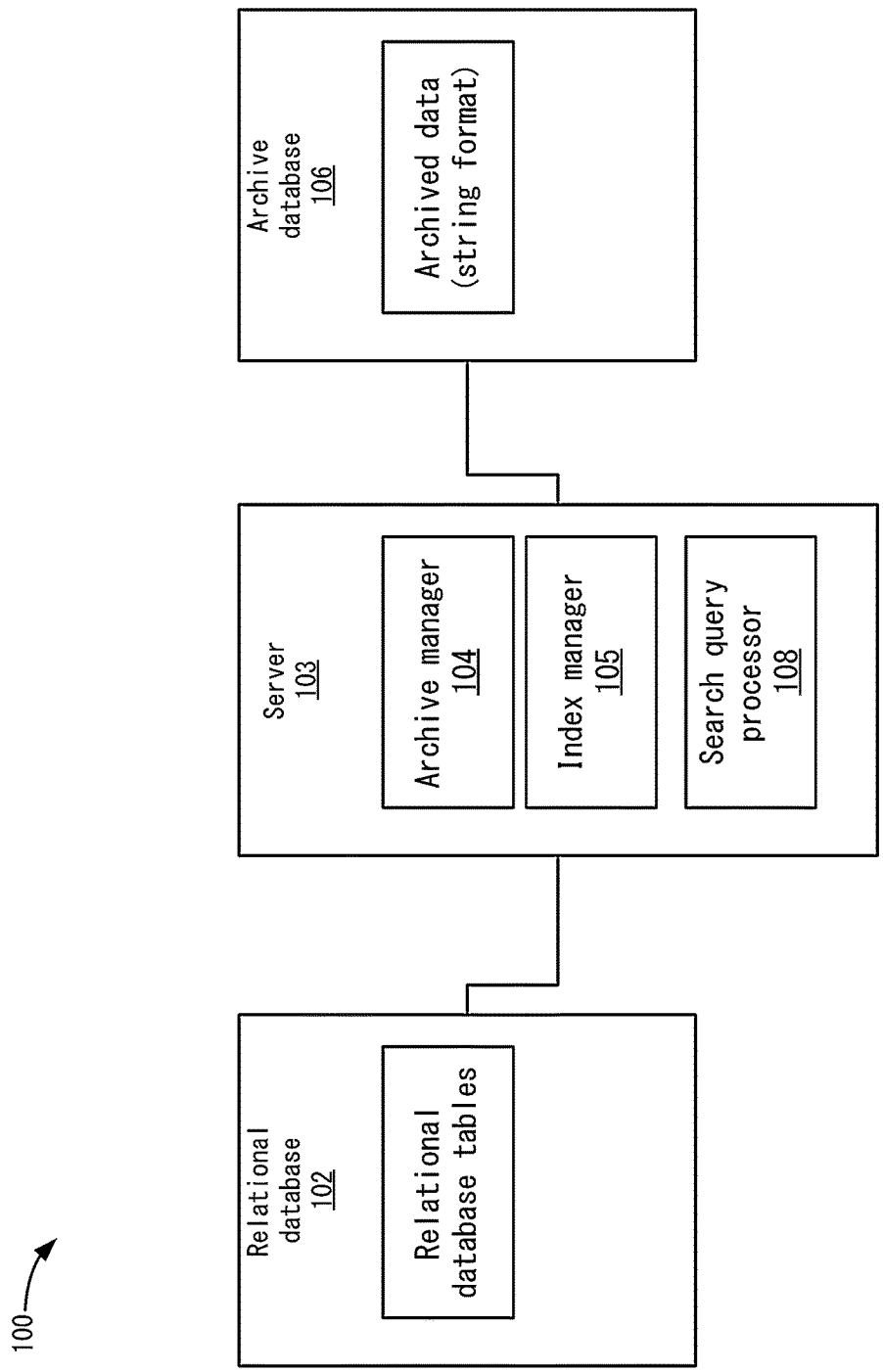
FIG. 1 depicts a system for archiving data according to one embodiment.

FIG. 1 depicts a system 100 for archiving data according to one embodiment. System 100 includes a relational database 102, an archive manager 104, a search query processor 108, and an archive database 106. Although single entities of relational database 102, archive manager 104, search query processor 108, and archive database 106 are shown, it will be understood that different numbers of each entity may be appreciated.

Relational database 102 may store data in a relational format. For example, relational database 102 includes tables of data items that are formally described and organized according to a relational model. In the relational model, rows in one table may be related to other rows in other tables. The related rows are linked via keys. To retrieve data in the related rows, a user submits a query using a "join" command. A person of skill in the art will appreciate how to implement a relational database. Also, although a relational format is described, other database formats may be used.

Server 103 includes archive manager 104 and search query processor 108. Archive manager 104 coordinates the archive process. Also, search query processor 108 processes search queries for data stored in archive database 106. Although archive manager 104 and search query processor 108 are shown as being in the same server, archive manager 104 and search query processor 108 may be found in different devices.

Archive database 106 stores data that archive manager 104 has archived from relational database 102. In archiving, the data that is archived to archive database 106 is deleted from relational database 102. This creates additional space in relational database 102.

Archive database 106 may store the archived data from relational database 102 in a different format than the data stored in relational database 102. In one embodiment, archive database 106 stores the archived data in an object-based format. For example, relational database 102 stores data for an object in different tables that are linked together. Archive manager 104 may retrieve data from tables in relational database 102 and create an object using the data. In one embodiment, archive manager 104 creates a business object, which summarizes a business transaction for a company. Archive manager 104 then stores the object in a "readable" format, such as a string or text format. A readable format may be a format that can be read by search query processor 108. Having the archived data in a readable format allows search query processor 108 to perform a text search on the archived data. Due to the data being stored in archive database 106 in a readable format, a company does not need to create pre-determined indexes that are used to index the data. However, an index manager 105 may create a functional index 214 that provides a search index. Index manager 105 may create the search index without having columns specified. Rather, index manager 105 may index terms in the strings. This provides the flexibility of searching inside everything in an object. For example, a user may search for any term in the business object. This is different from searching through a pre-determined index where a user can only search for terms in the pre-determined index. Further, the text search may be different from searching in the relational database model where a user uses joins to retrieve data from tables that are linked together. Using particular embodiments, archive database 106 can return an object without using a join.

Figure 2:
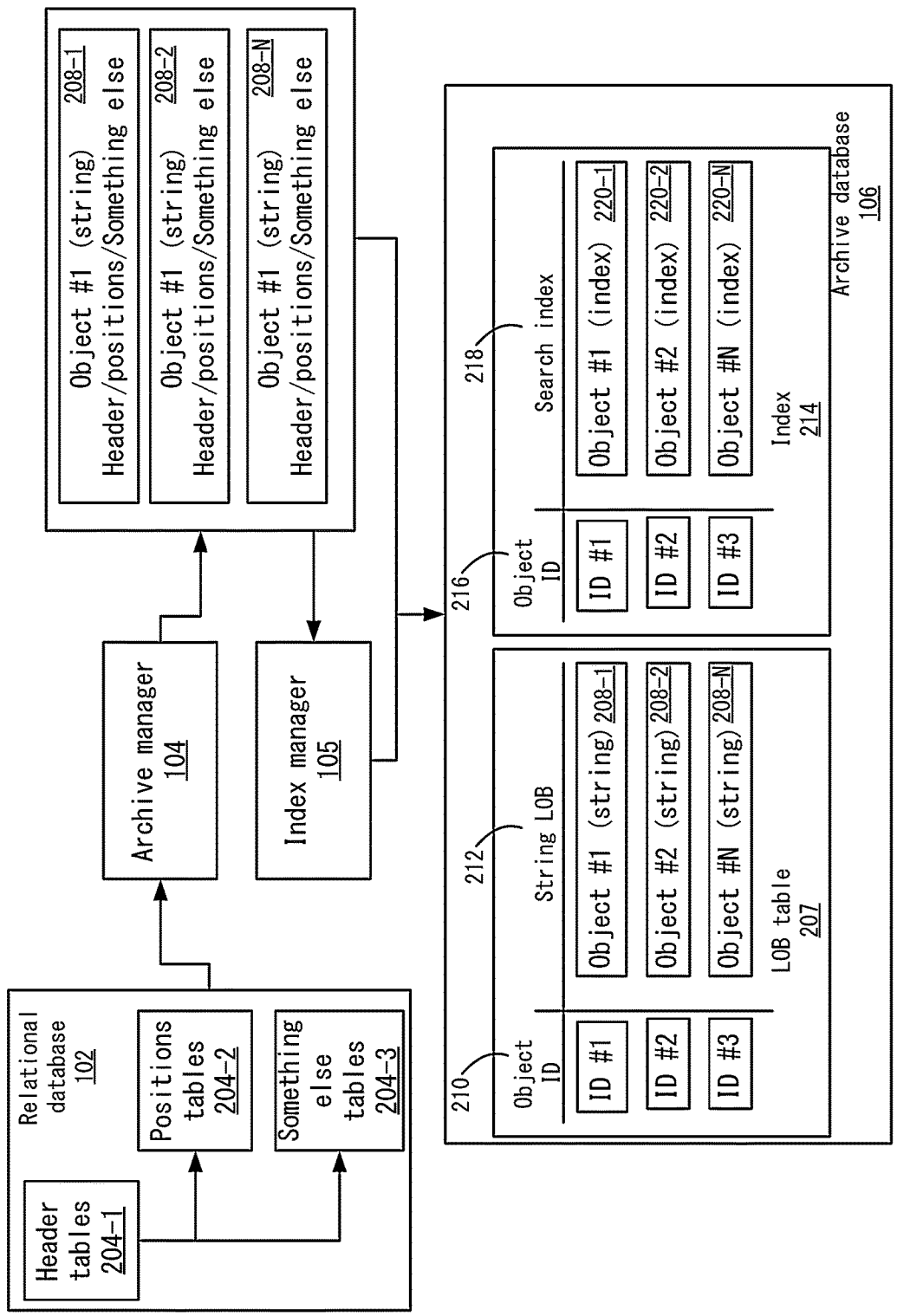
FIG. 2 depicts a more detailed example of the archive process according to one embodiment.

FIG. 2 depicts a more detailed example of the archive process according to one embodiment. As mentioned above, relational database 102 stores objects in a relational database table format in different tables. For example, objects are stored in various tables 204-1, 204-2, and 204-3. In one example, a headers table 204-1 includes headers for the objects, a positions table 204-2 is linked to headers table 204-1 and includes positions for the headers, and something-else table 204-3 may include other additional information and is linked to headers table 204-1. To retrieve data from relational database 102, a user would have to use a "join" command to join information from headers table 204-1, positions table 204-2, and something-else table 204-3 together to form the object. For example, archive manager 104 extracts the data for the objects using joins and converts the data from the relational data model to an object model. In this way, archive manager 104 creates the objects in a readable format, such as in a string. For example, various objects are shown as objects #1, #2, . . . #n at 208-1, 208-2, . . . 208-n.

After converting the data in the relational data model to the object model and creating a string for each object, archive manager 104 stores the objects in archive database 106. In one embodiment, archive manager 104 stores the objects in a large object (LOB) table 207. A LOB table stores the object as a single entry in the LOB table and is identified by an object identifier. Although archive manager 104 may store each object as an entry in the LOB table, archive manager 104 may store the object in multiple entries. In one example, a column 210 includes identifiers for the objects that are stored in the LOB table. For each identifier, table 207 stores a corresponding object in a string LOB column 212. For example, the objects shown at 208-1, 208-2, and 208-n are stored in entries in column 212.

In addition to creating a LOB table 207, index manager 105 may create a functional index 214 that provides a search index. For example, functional index 214 may be a table or any other structure that includes a search index for each object in a column 216. In one example, for each entry in the column 216, a search index for each respective object is stored in a column 218. The search index may be an index of the terms in the string of the object. The difference between the search index stored in functional index 218 and the string stored in LOB table 207 is that the search index has been run through a general text processing algorithm to create the search index. Also, pre-defining terms for the search index is not necessary. Rather, the index is automatically created based on the content of the objects. This may index each term of the string stored in column 212 of LOB table 207. For example, corresponding search indexes 220-1, 220-2, . . . 220-N correspond to respective objects 208-1, 208-2, . . . 208-N.

After creating tables 207 and 214, archive database 106 may compress these tables. The compression performed may not compromise the ability to perform searches on the objects. For example, searches on the archived data may still be performed using the search index stored in functional index table 214 after compression. Compared to the process described in the Background, particular embodiments store the objects in a readable format in archive database 106 initially. In the Background, compressed files were stored in the archive database initially. In particular embodiments, archive database 106 performs the compression on the archived data once the data is stored in archive database 106. Archive database 106 may use underlying database algorithms to perform compression that still allow searching of the objects.

Figure 3A:
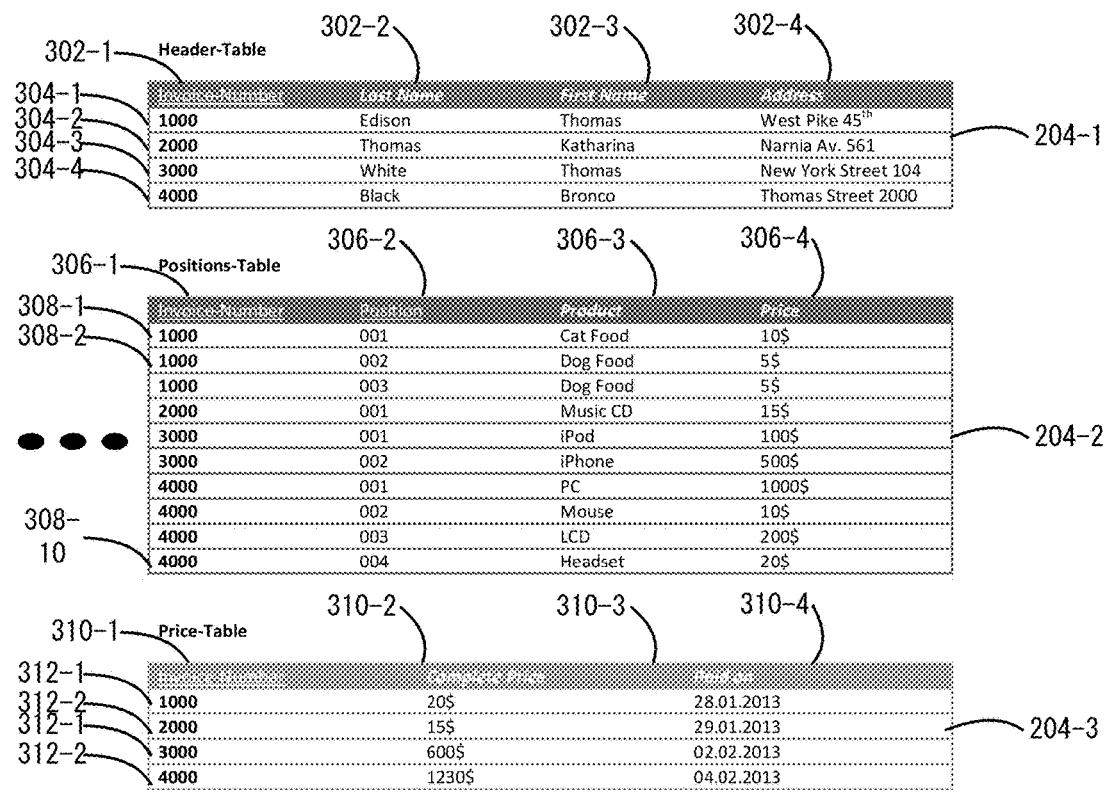
FIG. 3A shows an example of tables that may be stored in a relational database according to one embodiment.

FIG. 3A shows an example of tables that may be stored in relational database 102 according to one embodiment. A header table 204-1 includes information for various invoices 1000, 2000, 3000, and 4000. For example, rows 304-1, 304-2, 304-3, and 304-4 list data for invoices 1000, 2000, 3000, and 4000, respectively. Also, columns 302-1, 302-2, 302-3, and 302-4 list data for an invoice number, a last name, a first name, and an address, respectively. For example, for invoice #1000, the last name associated with this invoice is Edison, the first name is Thomas, and the address is West Pike $45^{th}$.

Positions table 204-2 includes columns 306-1, 306-2, 306-3, and 306-4 for the invoice #, position, product, and price, respectively. Also, rows 308-1, 308-2, . . . , 308-10 list various entries for the invoices. For example, in row 308-1, for invoice 1000, the position is 001 and the invoice is for cat food for a price of $10.00. For row 308-2, for invoice 1000, this is position 002, and the invoice is for dog food that was $5.00. The positions, products, and prices for various other invoices are also listed in positions table 204-2.

A price table 204-3 includes additional information in a something-else table. Price table 204-3 includes columns 310-1, 310-2, and 310-3 for invoice number, complete price, and a paid-on date. Rows 312-1-312-4 summarize the complete prices for invoices. For example, in row 312-1, invoice 1000 has a complete price of $20.00 that was paid on Jan. 28, 2013. The complete price of $20.00 adds up the prices for invoices 1000 found in positions table 204-1 in rows 308-1, 308-2, and 308-3 (e.g., $10.00+$5.00+ $5.00=$20.00).

Archive manager 104 may create objects from the tables summarized in FIG. 3A. For example, FIG. 3B shows an example of archived objects in LOB table 207 according to one embodiment. A column 350-1 identifies the objects and a column 350-2 includes entries for the objects in a string format. For example, rows 352-1-352-4 summarize strings that are created from header table 204-1, positions table 306-1, and price table 204-3. In row 352-1, object #1 is associated with a string that includes entries from rows 304-1, 308-1, 308-2, 308-3, and 312-1. For example, the terms (1000, Edison, Thomas, West Pike 45th) are from table 204-1, the terms (001, Cat Food, 10$; 002, Dog Food, 5$; 003, Dog Food, 5$) are from table 204-2, the terms (20$, 28.01.2013) are from table 204-3. In other words, the rows in different tables that include information for invoice 1000 are summarized in a string in row 352-1. Also, row 352-2 summarizes the entries for invoice 2000 in tables 204-1-204-3. Similarly, rows 352-3 and 352-4 summarize invoices 3000 and 4000, respectively.

Figure 4:
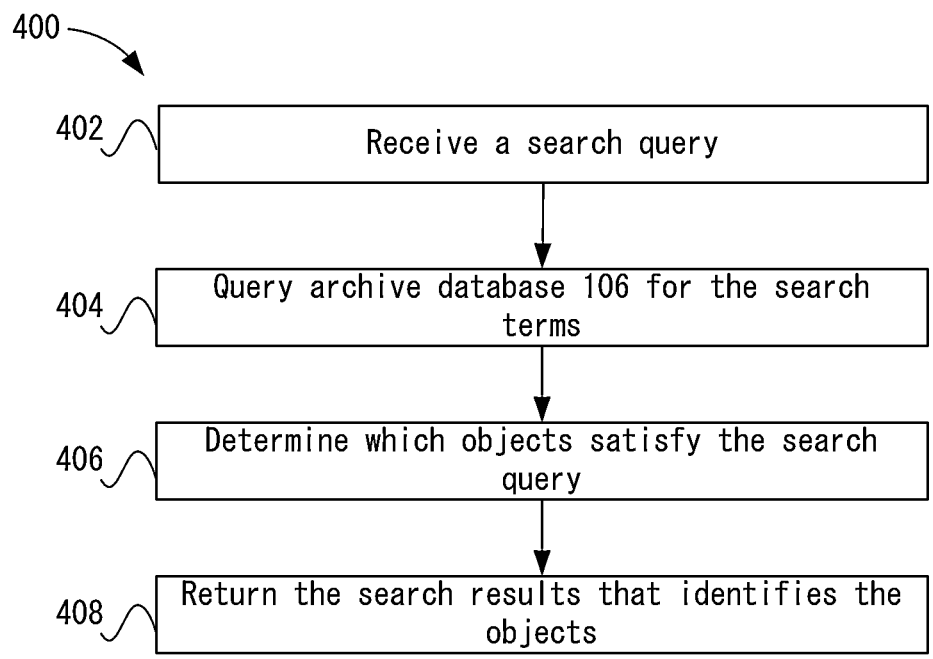
FIG. 4 depicts a simplified flowchart of a method for processing a search query according to one embodiment.

Once archive manager 104 stores archived data in archive database 106, users can perform searches for the data. FIG. 4 depicts a simplified flowchart 400 of a method for processing a search query according to one embodiment. At 402, search query processor 108 receives a search query. The search query may include a number of search terms, which may be textual terms. For example, the terms may be "Thomas" or "2000". At 404, search query processor 108 queries archive database 106 for the search terms. For example, search query processor 108 uses the search index to determine which objects include the search terms.

At 406, search query processor 108 determines which objects satisfy the search query. An object may satisfy the search query if the object includes the same search term (or a synonymous term). For example, an object may include the term Thomas. At 408, search query processor 108 returns the search results that identifies the objects. For example, the search result may include the strings stored in LOB table 207 for the respective objects. In one example, if object #1 and object #2 are included in the search result, then the entire strings shown at 208-1 and 208-2 are returned in a search result. Because strings are created, search query processor 108 may only return the entire string.

FIG. 5A shows a first example of a search result and FIG. 5B shows a second example of a search result according to one embodiment. In FIG. 5A, the search includes the term "Thomas". In this case, the term "Thomas" is included in objects #1, #2, #3, and #4, and the search result returns all four objects #1-#4.

It is noted that in the text search, the original table in which the term resided in relational database 202 does not affect the search results because archive manager 104 has converted the data in the relational database to a string format. For example, if a search for the term "Thomas" as a first name in a header table 204-1 shown in FIG. 3A, then objects #1 and #3 may be returned because these objects have "Thomas" as the first name. Objects #2 and #4 have the term "Thomas" as the last name and the address, respectively. Thus, a search with "Thomas" as the first name in relational database 102 would not return objects #2 and #4. However, in this case where the information for the objects has been joined and archived as a string, if the string includes the term "Thomas", search query processor 108 returns any object that includes the term (e.g., objects #1, #2, #3, and #4 in this case). In other embodiments, a user may subsequently filter search results. For example, a user may specify a search is for Thomas as a first name. In this case, search query processor 108 determines only objects #1 and #3 because these objects have Thomas as the first name. Search query 108 may determine which objects include Thomas as the first name based on the structure of the string (e.g., last name, first name), or by other methods, such as the terms in the string may be labeled as last name or first name. These labels may be stored as part of the strings (and being marked/escaped to be recognized as such) or may be persisted separately in a convenient metadata structure (that determines which part of the string represents a value of which search attribute that is used for subsequent filtering).

In FIG. 5B, a search for "2000" may return objects #2 and #4. In this case, objects #2 and #4 include the term 2000 while objects #1 and #3 do not. As noted above, the search term 2000 is included in different columns and/or tables in relational database 102. For example, for object #2, 2000 is the invoice number found in header table 204-1. For object #4, 2000 is found in column 302-4 in the address for invoice 4000. As discussed above, because the string includes the search term 2000 for both objects #2 and #4, search query processor 108 returns a search result including objects #2 and #4.

Figure 6:
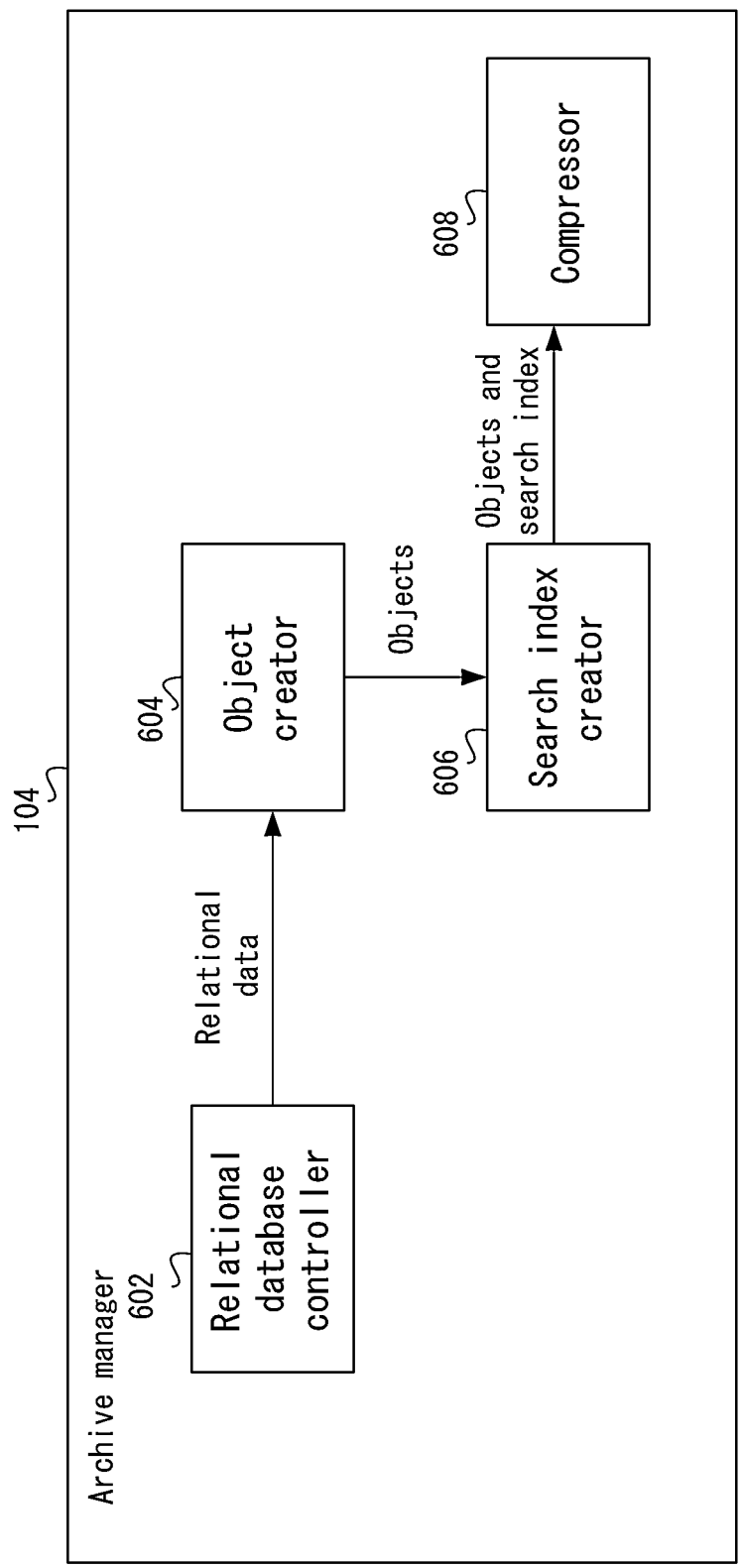
FIG. 6 depicts a more detailed example of an archive manager according to one embodiment.

FIG. 6 depicts a more detailed example of archive manager 104 according to one embodiment. A relational database controller 602 is configured to query relational database 102 for data for objects. For example, relational database controller 602 may send joins for tables to create objects that have data stored in various tables that are linked together.

Once the data is extracted from relational database 102, an object creator 604 creates objects for the data. For example, object creator 604 may create strings for each object that include the data for each respective object.

Once the strings are created, a search index creator 606 may index the strings. For example, a database search engine may process the strings and index the terms of the strings. In this case, manual indexes for terms do not need to be created. Once the strings and search index are created, a storage manager 608 stores the strings and search index in archive database 106. A compressor 608 then compresses the strings and search index. For example, compressor 608 compresses the LOB table 207 and functional index 214.

Accordingly, archive manager 104 stores archived data in a readable string format that can be indexed by a database search engine. Archive manager 104 does not need to create manual indexes on fields and each search searches each field of the archived data.

Figure 7:
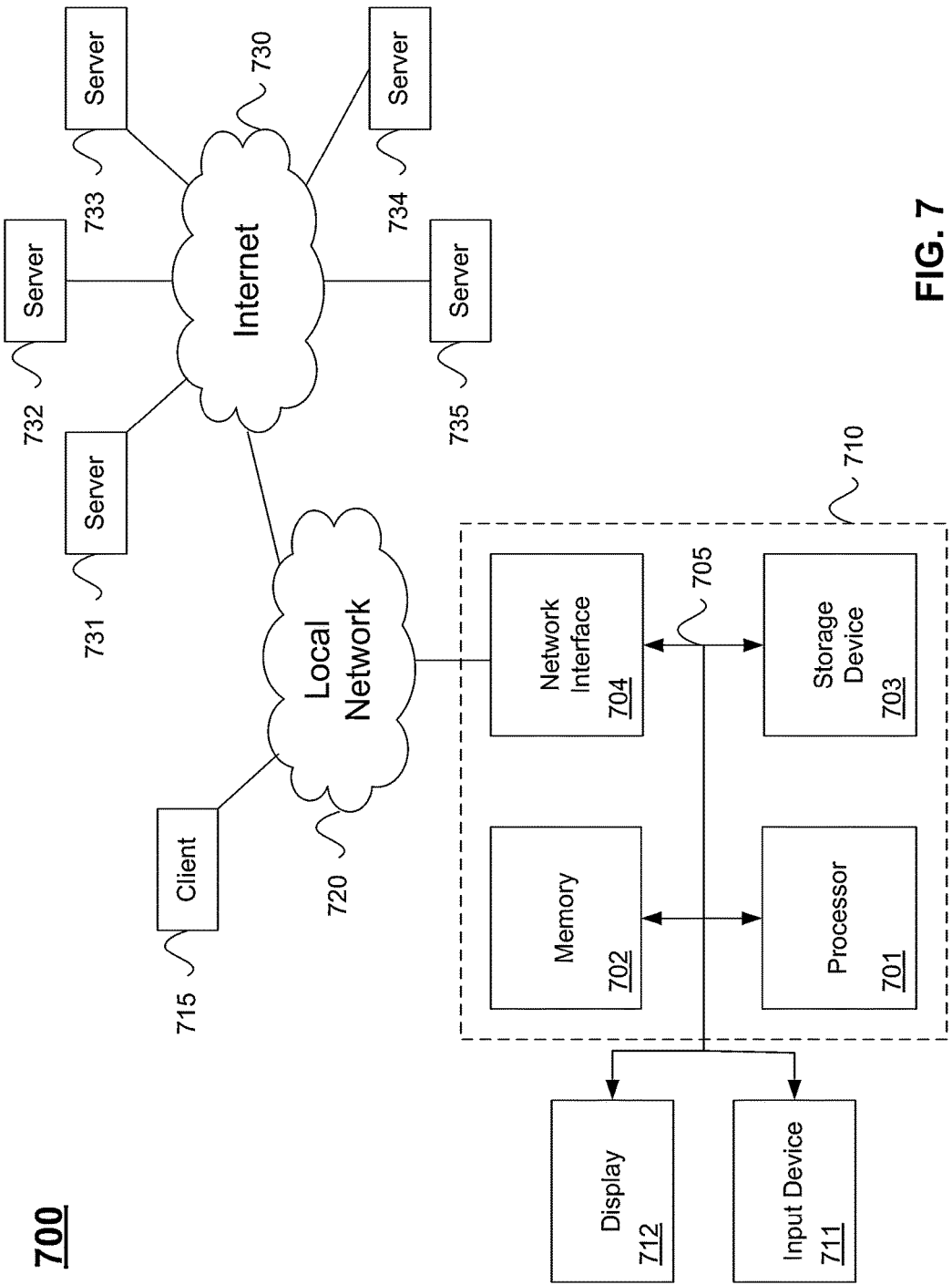
FIG. 7 illustrates hardware of a special purpose computing machine configured with the archive system according to one embodiment.

FIG. 7 illustrates hardware of a special purpose computing machine configured with the archive system according to one embodiment. An example computer system 710 is illustrated in FIG. 7. Computer system 710 includes a bus 705 or other communication mechanism for communicating information, and a processor 701 coupled with bus 705 for processing information. Computer system 710 also includes a memory 702 coupled to bus 705 for storing information and instructions to be executed by processor 701, including information and instructions for performing the techniques described above, for example. This memory may also be used for storing variables or other intermediate information during execution of instructions to be executed by processor 701. Possible implementations of this memory may be, but are not limited to, random access memory (RAM), read only memory (ROM), or both. A storage device 703 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 703 may include source code, binary code, or software files for performing the techniques above, for example. Storage device and memory are both examples of computer readable storage mediums.

Computer system 710 may be coupled via bus 705 to a display 712, such as a cathode ray tube (CRT) or liquid crystal display (LCD), for displaying information to a computer user. An input device 711 such as a keyboard and/or mouse is coupled to bus 705 for communicating information and command selections from the user to processor 701. The combination of these components allows the user to communicate with the system. In some systems, bus 705 may be divided into multiple specialized buses.

Computer system 710 also includes a network interface 704 coupled with bus 705. Network interface 704 may provide two-way data communication between computer system 710 and the local network 720. The network interface 704 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 704 sends and receives electrical, electromagnetic, or optical signals that carry digital data streams representing various types of information.

Computer system 710 can send and receive information through the network interface 704 across a local network 720, an Intranet, or the Internet 730. In the Internet example, software components or services may reside on multiple different computer systems 710 or servers 731-735 across the network. The processes described above may be implemented on one or more servers, for example. A server 731 may transmit actions or messages from one component, through Internet 730, local network 720, and network interface 704 to a component on computer system 710. The software components and processes described above may be implemented on any computer system and send and/or receive information across a network, for example.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be operable to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising:
    determining, by a computer system, data stored in a plurality of tables in a first database formatted in a relational data model for archiving, the data including a plurality of terms that are stored as values in separate columns in the plurality of tables;
    performing, by the computer system, a database query to extract terms in the plurality of terms from the separate columns in the plurality of tables in the first database and combining the terms into a set of objects in a text format, wherein an object in the set of objects includes a set of terms from a set of values in separate columns in the plurality of tables that are associated with the object;
    storing, by the computer system, the set of objects in the text format in a second database formatted in an object model, wherein a search query processor is able to search terms in the set of objects in the text format; and
    deleting, by the computer system, the data stored in the plurality of tables in the first database in response to the archiving.

2. The method of claim 1, wherein the set of values from the plurality of tables are extracted from the database to be combined into the object.

3. The method of claim 1, wherein combining the terms comprises converting the terms in the relational model to the set of objects in the object model.

4. The method of claim 1, further comprising compressing, by the computer system, the set of objects in the text format after storing in the second database.

5. The method of claim 1, further comprising generating, by the computer system, a search index of the set of objects based on terms in the set of objects, wherein the text search of the set of objects uses the search index to search for terms in the set of objects.

6. The method of claim 5, wherein generating, by the computer system, the search index comprises indexing each term in the set of objects.

7. The method of claim 1, further comprising:
    receiving, by the computer system, a query including a search term;
    searching, by the computer system, for the search term in the set of objects stored in the second database; and
    returning, by the computer system, any objects in the set of objects stored in the second database that include the search term.

8. The method of claim 7, wherein any objects returned include all terms in the objects.

9. The method of claim 1, wherein each object in the set of objects is stored in an entry in a table in the second database.

10. The method of claim 1, wherein each object in the set of objects is stored as a string in the second database.

11. The method of claim 1, wherein the readable format is a format that can be parsed by the search query processor.

12. A non-transitory computer-readable storage medium containing instructions, that when executed, control a computer system to be configured for:

determining data stored in a plurality of tables in a first database formatted in a relational data model for archiving, the data including a plurality of terms that are stored as values in separate columns in the plurality of tables;

performing a database query to extract terms in the plurality of terms from the separate columns in the plurality of tables in the first database and combining the terms into a set of objects in a text format, wherein an object in the set of objects includes a set of terms from a set of values in separate columns in the plurality of tables that are associated with the object;

storing the set of objects in the text format in a second database formatted in an object model, wherein a search query processor is able to search terms in the set of objects in the text format; and deleting the data stored in the plurality of tables in the first database in response to the archiving.

13. The non-transitory computer-readable storage medium of claim 12, wherein combining the terms comprises converting the terms in the relational model to the set of objects in the object model.

14. The non-transitory computer-readable storage medium of claim 12, further configured for compressing the set of objects in the text format after storing in the second database.

15. The non-transitory computer-readable storage medium of claim 12, further configured for generating a search index of the set of objects based on terms in the set of objects, wherein the text search of the set of objects uses the search index to search for terms in the set of objects.

16. The non-transitory computer-readable storage medium of claim 12, further configured for:

receiving a query including a search term;

searching for the search term in the set of objects stored in the second database; and returning any objects in the set of objects stored in the second database that include the search term.

17. The non-transitory computer-readable storage medium of claim 16, wherein any objects returned include all terms in the objects.

18. The non-transitory computer-readable storage medium of claim 12, wherein each object in the set of objects is stored as a string in the second database.

19. The non-transitory computer-readable storage medium of claim 12, wherein the readable format is a format that can be parsed by the search query processor.

20. An apparatus comprising:

one or more computer processors; and a non-transitory computer-readable storage medium comprising instructions, that when executed, control the one or more computer processors to be configured for:

determining data stored in a plurality of tables in a first database formatted in a relational data model for archiving, the data including a plurality of terms that are stored as values in separate columns in the plurality of tables;

performing a database query to extract terms in the plurality of terms from the separate columns in the plurality of tables in the first database and combining the terms into a set of objects in a text format, wherein an object in the set of objects includes a set of terms from a set of values in separate columns in the plurality of tables that are associated with the object;

storing the set of objects in the text format in a second database formatted in an object model, wherein a search query processor is able to search terms in the set of objects in the text format; and deleting the data stored in the plurality of tables in the first database in response to the archiving.

* * * * *